Patented Mar. 27, 1923.

1,450,140

UNITED STATES PATENT OFFICE.

FRANK B. DANEHOWER, OF PHILADELPHIA, PENNSYLVANIA, ASSIGNOR TO ROSS-TACONY CRUCIBLE COMPANY, OF PHILADELPHIA, PENNSYLVANIA, A CORPORATION OF PENNSYLVANIA.

REFRACTORY ARTICLE AND METHOD OF MAKING THE SAME.

No Drawing.    Application filed May 15, 1922.    Serial No. 561,024.

*To all whom it may concern:*

Be it known that I, FRANK B. DANEHOWER, a citizen of the United States, residing at Philadelphia, in the county of Philadelphia and State of Pennsylvania, have invented a new and useful Improvement in Refractory Articles and Methods of Making the Same, of which the following is a specification.

The invention has particular relation to refractory articles such as crucibles used for the melting of metals, and of which graphite flake, silicon carbide and other refractory materials are the principal components, although it may be applied to many other refractory articles such as bricks, retorts, muffles and the like.

Referring more particularly to the manufacture of graphite crucibles, it has been customary to manufacture them from a mixture of flake graphite and highly plastic clay as a binding medium. Such articles rapidly fail in use due to the oxidation, when heated, of the graphite contained in the exterior surface of the crucible and the fusing of the clay residue. There is also a considerable wasting of the crucible due to the difference in the coefficient of expansion of the fused clay on the surface and that portion of the crucible still containing graphite, resulting in flaking off of the fused surface each time such articles are heated or chilled. Recent improvements have been made in such articles by the addition of substantial amounts of silicon carbide, crystalline alumina and other inert refractories, such additions reducing the tendency to flaking very materially, but the fusing of the clay is not prevented by such additions and the articles are consequently short-lived.

I have discovered that it is possible to produce a greatly superior refractory article by the use of a bond composed of a synthetic phenol resin or condensation product, such as are manufactured by the reaction of phenol with hexamethylene-tetramine or formaldehyde. Good results are attained by the use of such binder in the form of a thin solution of varnish consistency.

I will now describe the procedure I may follow in the manufacture of graphite crucibles.

I take fifty parts by weight of flake graphite and fifty parts by weight of powdered silicon carbide and mix thoroughly in the dry condition. I next add seventeen parts by weight of phenol resin in the form of a thin solution and complete the mixing in a chaser or pan mill. I have found it to be very desirable to mix the admixture thoroughly so that every particle of graphite and silicon carbide is coated with a film of the binder. The crucibles are then manufactured either by spinning as is customary in the industry, or they may be pressed or tamped in metal moulds. After removal from the mould the crucibles may be allowed to stand for several hours when they harden by the evaporation of the volatile constituents of the synthetic resin and may be handled without risk of deformation. The crucibles are next placed in a sagger immersed in powdered graphite or other carbon powder to prevent oxidation and burnt in a kiln or furnace for eight to twenty hours. They may then be rapidly cooled and coated with a solution of silicate of soda or other suitable glaze and are ready for use.

I have found that refractory articles made in accordance with my invention as above described are greatly superior to any hitherto manufactured, being more refractory, denser in structure and capable of withstanding very rapid changes in temperature without damage. I am not able to explain with certainty the exact nature of the bonding effect produced by the destruction at red heat of the synthetic resin but it appears probable that it is partly due to the action of the phenol vapors on the other components of the mixture as the resin is destroyed. The advantages of articles manufactured by my process I find are due to the distinctive and new physical properties of the residue left by the decomposition of the phenol resin. This residue remains as a film uniformly and continuously coating the refractory particles and uniting these particles one with the other. This residue instead of being spongy and vesicular in structure as in tar or pitch bonded articles, is solid and elastic and very similar in its properties to the flake graphite to which it bears a strong physical resemblance. Films or flakes of this residue may be bent and otherwise deformed without fracture. This peculiar property gives to the articles so bonded a resiliency and elasticity impossible of attainment with other bonds at present in use in the industry and constitutes one of the most valuable features of my invention. Articles manufactured according to my invention are so dense that they emit a metallic sound when struck with a hammer, whereas such articles bonded with pitch or tar are porous and sound dead. A further important advantage of the synthetic resin bond over pitch or tar bonds is that the process of manufacture is in the cold state, whereas pitch and tar bonded articles must be moulded or formed while hot.

It is understood that I do not limit myself to a mixture of graphite and silicon carbide alone as other fillers such as flint and aluminum oxide may be used. Neither do I limit myself to the exact amount of synthetic resin given as lighter or heavier solutions may be used successfully and it is even possible to use the binder in the powdered form, moistening with suitable organic solvents, such as a mixture of equal parts of benzol and alcohol. All synthetic resins of which phenol or carbolic acid is a component have given satisfactory results.

I claim:

1. A refractory article of manufacture being a baked product and comprising a comminuted refractory body and the residue of decomposition of synthetic phenol resin which acts as a bond for the comminuted refractory body.

2. A refractory article of manufacture being a baked crucible comprising an admixture of graphite, silicon carbide and the residue of the decomposition of synthetic phenol resin.

3. The method of making a refractory crucible which consists in dry mixing powdered silicon carbide and graphite, cold mixing with this admixture a solution of synthetic phenol resin in a volatile solvent, shaping the admixture into crucible form and permitting the solvent to evaporate, and heat treating the crucible and decomposing the synthetic phenol resin to provide a bond.

4. In the manufacture of refractory articles the improvement which consists in cold mixing synthetic phenol resin with the refractories, and decomposing the synthetic phenol resin by the application of heat to provide a bond.

5. A refractory article of manufacture being a baked resonant product of sub-metallic lustre and consisting of a comminuted refractory and the residue of the decomposition of synthetic phenol resin and characterized by infusibility at substantially 1800° C. and by resistance to sudden temperature changes.

FRANK B. DANEHOWER.